US008981725B2

(12) United States Patent
Kim

(10) Patent No.: US 8,981,725 B2
(45) Date of Patent: Mar. 17, 2015

(54) BATTERY PROTECTION CIRCUIT INCLUDING BATTERY MANAGEMENT SYSTEM AND FUSE-BLOWING CIRCUIT AND METHOD OF CONTROLLING SAME

(75) Inventor: Young-Jun Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 759 days.

(21) Appl. No.: 13/067,695

(22) Filed: Jun. 21, 2011

(65) Prior Publication Data

US 2012/0139494 A1     Jun. 7, 2012

(30) Foreign Application Priority Data

Dec. 1, 2010   (KR) .................. 10-2010-0121330

(51) Int. Cl.
   *H02J 7/00*    (2006.01)
   *H02H 7/18*    (2006.01)
(52) U.S. Cl.
   CPC .............. *H02J 7/0031* (2013.01); *H02H 7/18* (2013.01); *H02J 7/0029* (2013.01); *H02J 2007/0039* (2013.01)
   USPC .......................................... 320/134; 320/136
(58) Field of Classification Search
   CPC .............. H02J 7/0031; H02J 2007/004; H02J 2007/0039; H02J 2007/0037; H02J 7/0029
   USPC ........................................ 320/134, 136, 128
   See application file for complete search history.

(56) References Cited

U.S. PATENT DOCUMENTS

| | | | |
|---|---|---|---|
| 4,125,682 A | 11/1978 | Bordet et al. | |
| 2001/0054880 A1 | 12/2001 | Haraguchi et al. | |
| 2003/0095369 A1* | 5/2003 | Knoedgen | 361/104 |
| 2008/0012532 A1* | 1/2008 | Denning | 320/134 |
| 2010/0007310 A1* | 1/2010 | Kawamoto et al. | 320/134 |
| 2010/0214707 A1* | 8/2010 | Yun | 361/92 |

FOREIGN PATENT DOCUMENTS

| | | |
|---|---|---|
| JP | 2002-010509 A | 1/2002 |
| JP | 2008-288046 A | 11/2008 |
| KR | 10-2004-0036441 A | 4/2004 |
| KR | 10-2006-0022558 A | 3/2006 |
| KR | 10-2007-0090498 A | 9/2007 |
| KR | 10-2008-0034322 A | 4/2008 |

* cited by examiner

*Primary Examiner* — Yalkew Fantu
*Assistant Examiner* — Manuel Hernandez
(74) *Attorney, Agent, or Firm* — Lee & Morse, P.C.

(57) ABSTRACT

A battery protection circuit and a method of controlling the same. The battery protection circuit includes a fuse blowing path connected in parallel to at least a portion of a high-current path between a battery and a terminal unit, the high-current path having a fuse therein, and a fuse current control switch in the fuse blowing path, the fuse current control switch controlling a current flow along the fuse blowing path. The battery protection circuit may completely blow the fuse when a battery malfunctions.

12 Claims, 5 Drawing Sheets

BATTERY PROTECTION CIRCUIT INCLUDING BATTERY MANAGEMENT SYSTEM AND FUSE-BLOWING CIRCUIT AND METHOD OF CONTROLLING SAME

BACKGROUND

1. Field

One or more embodiments relate to a battery protecting circuit and a method of controlling the same.

2. Description of the Related Art

Increasing use of portable electronic devices, for example, mobile phones, digital cameras, or notebooks, has led to active development of batteries as a power supply source for driving the portable electronic devices.

In general, a battery is provided in the form of a battery pack together with a protection circuit for controlling charging and discharging of a battery. The battery contained in the battery pack may malfunction during charging or discharging. In response, the protection circuit may include various devices for stably controlling charging and discharging of the battery.

SUMMARY

Embodiments are therefore directed to a battery protection circuit. The battery protection circuit may include a fuse blowing path connected in parallel to at least a portion of a high-current path between a battery and a terminal unit, the high-current path having a fuse therein, and a fuse current control switch in the fuse blowing path, the fuse current control switch controlling a current flow along the fuse blowing path.

The may include a charge/discharge switch in the high-current path, the charge/discharge switch controlling charging and discharging of the battery.

The fuse may be connected between the charge/discharge switch and the terminal unit.

The fuse blowing path may be connected in parallel with the charge/discharge switch.

The charge/discharge switch may include a charging control switch in the high-current path, the charging control switch controlling charging of a battery, and a discharging control switch in the high-current path, the discharging control switch controlling discharging of the battery.

The battery protection may include a fuse blowing switch between the fuse and ground, the fuse blowing switch controlling blowing of the fuse.

The battery protection circuit may include a battery management system generating a control signal and applying the control signal to the fuse current control switch to turn on the fuse current control switch when the battery malfunctions.

The battery management system may apply the control signal to the fuse blowing switch to blow the fuse.

The battery management system may generate another control signal and apply the another control signal to the fuse blowing switch to turn on the fuse blowing switch when the battery malfunctions.

The battery protection circuit may include a Zener diode connected in parallel to the fuse blowing switch.

The battery protection circuit may include a diode in the fuse blowing path.

The diode may be between the fuse current control switch and the fuse.

The battery protection circuit may include a resistor in the fuse blowing path, the resistor between the fuse current control path and the high current path.

Embodiments may be directed to a method of controlling a battery protection circuit including a fuse blowing path connected in parallel to at least a portion of a high-current path between a battery and a terminal unit, the high-current path having a fuse therein, and a fuse current control switch in the fuse blowing path, the fuse current control switch controlling a current flow in the fuse blowing path. The method may include monitoring a state of the battery, and when the battery malfunctions, turning on the fuse current control switch to allow a current to flow along the fuse blowing path.

The battery protection circuit may further include a fuse blowing switch between the fuse and ground, the fuse blowing switch controlling blowing of the fuse. The method may include, when the battery malfunctions, turning on the fuse blowing switch to blow the fuse.

Turning on the fuse current control switch and the fuse blowing switch may be in response to a single control signal.

Turning on the fuse current control switch may be in response to a first signal and turning on the fuse blowing switch may be in response to a second control signal.

The battery protection circuit may further include a charging/discharging switch in the high current path. The method may include, before turning on the fuse current control switch, turning off the charging/discharging switch, and determining whether the battery continues to malfunction.

Embodiments may be directed to a method of protecting a battery. The method may include providing a fuse in a high current path between the battery and a terminal unit, forming a fuse blowing path, separate from the high current path, the fuse blowing path connected in parallel to at least a portion of the high current path, and applying a current from the fuse blowing path to the fuse when the battery malfunctions.

The method may include turning on a fuse blowing switch between the fuse and ground when the battery malfunctions.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
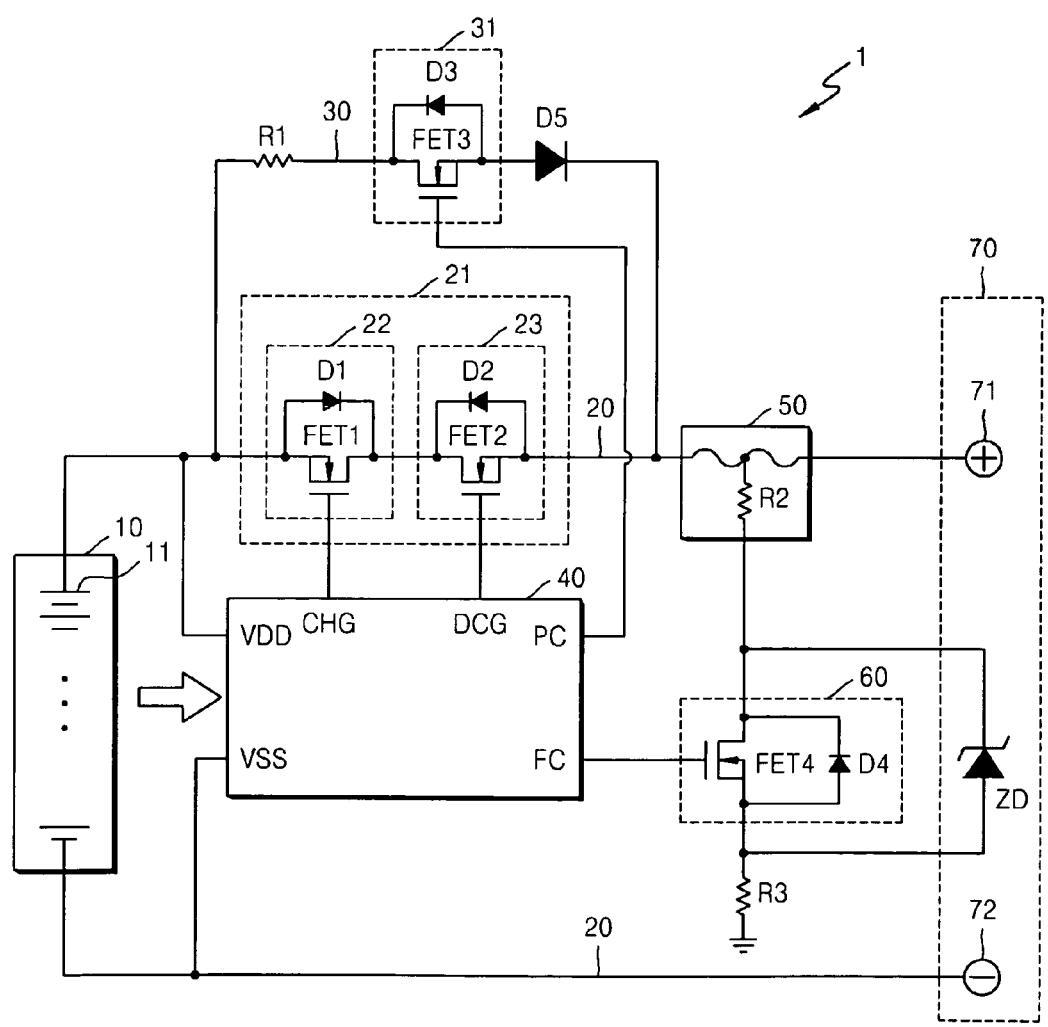
FIG. 1 illustrates a circuit diagram of a battery pack according to an embodiment.

Korean Patent Application No. 10-2010-0121330, filed on Dec. 1, 2010, in the Korean Intellectual Property Office, and entitled: "Battery Protection Circuit and Method of Controlling Same," is incorporated by reference herein in its entirety.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

FIG. 1 illustrates a circuit diagram of a battery pack 1 according to an embodiment. Referring to FIG. 1, the battery pack 1 may include a battery 10, a high-current path 20, a charge and discharge control switch 21, a fuse blowing path 30, a fuse current control switch 31, a battery management system (BMS) 40, a fuse 50, a fuse blowing switch 60, and a terminal unit 70.

The battery 10 supplies electric power stored therein to an electronic device on which the battery pack 1 is mounted. If a charger is connected to the battery pack 1, the battery 10 may be charged with external electric power. The battery 10 may include at least one battery cell 11. The battery cell 11 may be a rechargeable secondary battery, e.g., a nickel-cadmium battery, a lead storage battery, a nickel metal hydride battery (NiMH), a lithium ion battery, a lithium polymer battery, and so forth.

The high-current path 20 refers to a path along which a charging and discharging current flows between the battery 10 and the terminal unit 70. In detail, the high-current path 20 refers to a path formed between a positive terminal 71 and a positive electrode of the battery 10 and a path between a negative terminal 72 and a negative electrode of the battery 10. A relatively high current flows along the high-current path 20.

The charge and discharge control switch 21 is in the high-current path 20 and controls flow of the charging current and discharging current. The charge and discharge control switch 21 may include a charging control switch 22 for blocking a charging current and a discharging control switch 23 for blocking a discharging current.

The charging control switch 22 may include a field effect transistor FET1 and a parasitic diode D1. The FET1 is connected such that a current flowing from the positive terminal 71 to the battery 10 or from the battery 10 to the negative terminal 72 is controlled. That is, the FET1 is used to block flow of a charging current. In this regard, the FET1 is formed such that a discharging current flows through the parasitic diode D1.

The discharging control switch 23 may include a field effect transistor FET2 and a parasitic diode D2. The FET2 is connected such that a current flowing from the negative terminal 72 to the battery 10 or from the battery 10 to the positive terminal 71 is controlled. That is, the FET2 is used to block flow of a discharging current. The FET2 is formed such that a charging current flows through the parasitic diode D2. A connection direction between a source electrode and a drain electrode of the FET2 may be opposite to a connection direction between a source electrode and a drain electrode of the FET1.

The charging control switch 22 and the discharging control switch 23 are not limited to using a field effect transistor. For example, the charging control switch 22 and the discharging control switch 23 may be any one of various devices that perform a switching function.

The fuse blowing path 30 may be a path for a fuse blowing current that is used to blow the fuse 50. The fuse blowing path 30 may be connected in parallel to at least a portion of the high-current path 20. The charge and discharge control switch 21 may be in the portion of the high-current path 20 connected in parallel to the fuse blowing path 30. The fuse current control switch 31 may be in the fuse blowing path 30. The fuse blowing path 30 may include a resistor R1 for controlling intensity of the fuse blowing current and a diode D5 for preventing formation of a reverse current.

The fuse current control switch 31 is a switching device for controlling flow of the fuse blowing current. The fuse current control switch 31 may include a field effect transistor FET3 and a parasitic diode D3. A connection direction between a source electrode and a drain electrode of the FET3 may be determined such that a connection direction between an anode and a cathode of the parasitic diode D3 is opposite to a connection direction between an anode and a cathode of the diode D5 in the fuse blowing path 30.

The BMS 40 may control charging and discharging of the battery 10, and may perform cell balancing control on the battery cell 11 included in the battery 10. The BMS 40 may include a power source terminal VDD, a ground terminal VSS, a charging control terminal CHG, a discharging control terminal DCG, a path control terminal PC, a fuse control terminal FC, etc.

A power source voltage and a ground voltage are respectively applied to the power source terminal VDD and the ground terminal VSS. If the battery pack 1 malfunctions, the charging control terminal CHG and the discharging control terminal DCG respectively output a charging control signal for controlling an operation of the charging control switch 22 and/or a discharging control signal for controlling an operation of the discharging control switch 23.

The BMS 40 monitors conditions of the battery pack, e.g., a charge state or discharge state of the battery 10 or a current flow state inside the battery pack 1. The BMS 40 may measure an intermediate voltage between battery cells when the battery 10 includes a plurality of battery cells 11. According to monitoring or measurement results, the BMS 40 may perform cell balancing of the battery cells 11 and/or may control charging and discharging of the battery 10. Although not illustrated in FIG. 1, the BMS 40 may further include terminals for measuring an intermediate voltage or for monitoring a charge state, a discharge state, or a current flow.

In the present embodiment, the BMS 40 controls all components of the battery pack 1. However, the structure of the BMS 40 is not limited thereto. For example, the battery pack 1 may further include an analog front end (not shown) for monitoring the state of the battery 10 and controlling operations of the charging control switch 22 and the discharging control switch 23. In this case, the BMS 40 may control the analog front end.

In order to blow the fuse 50, the BMS 40 according to the present embodiment may generate a first blowing signal applied to the fuse blowing switch 60 and a second blowing signal applied to the fuse blowing path 30, e.g., to the fuse current control switch 31. The fuse control terminal FC and the path control terminal PC may respectively output the first blowing signal and the second blowing signal.

The fuse 50 the high-current path 20 may be between the charge and discharge control switch 21 and the terminal unit 70. If the battery 10 malfunctions, the fuse 50 may be blown so that a charging current or a discharging current may not flow along the high-current path 20. The fuse 50 may include a resistor R2 connected between the high-current path 20 and ground. If the intensity of a current flowing through the resistor R2 is equal to or greater than a reference value, the fuse 50 melts due to heat generated at the resistor R2. Thus, the current flow is blocked.

If the battery pack 1 malfunctions, flow of a charging current or a discharging current should be blocked by the charge and discharge control switch 21. However, if the malfunction occurring in the battery pack 1 is not overcome even when the charge and discharge control switch 21 is controlled, the fuse 50 is blown so that a current flow is permanently blocked. That is, the battery pack 1 may be permanently disabled, i.e., the battery protection circuit would need to be replaced before the battery pack 1 could be used again.

The fuse blowing switch 60 may allow a current to flow through the resistor R2 included in the fuse 50 so as to blow the fuse 50. The fuse blowing switch 60 may be between the fuse 50 and ground, and may be turned on when the first blowing signal is applied thereto by the BMS 40, thereby allowing a current to flow through the resistor R2. The fuse blowing switch 60 may include a field effect transistor FET4 and a parasitic diode D4.

The battery pack 1 may further include a Zener diode ZD connected in parallel to the fuse blowing switch 60. The Zener diode ZD may be connected between a source electrode and a drain electrode of the FET4 so as to prevent the FET4 from being damaged upon application of a high current, e.g., a surge current, an inrush current, an electrostatic discharge, and so forth.

The terminal unit 70 may connect the battery pack 1 to an external device, e.g., an electronic device or a charging device. The terminal unit 70 may include the positive terminal 71 and the negative terminal 72. A charging current enters through and a discharging current flows out of the positive terminal 71. A charging current flows out of and a discharging current enters through the negative terminal 72. Although not illustrated in FIG. 1, the terminal unit 70 may include additional terminals, e.g., a terminal for transmitting data to the external device and/or a terminal for receiving a control signal from the external device.

Figure 2:
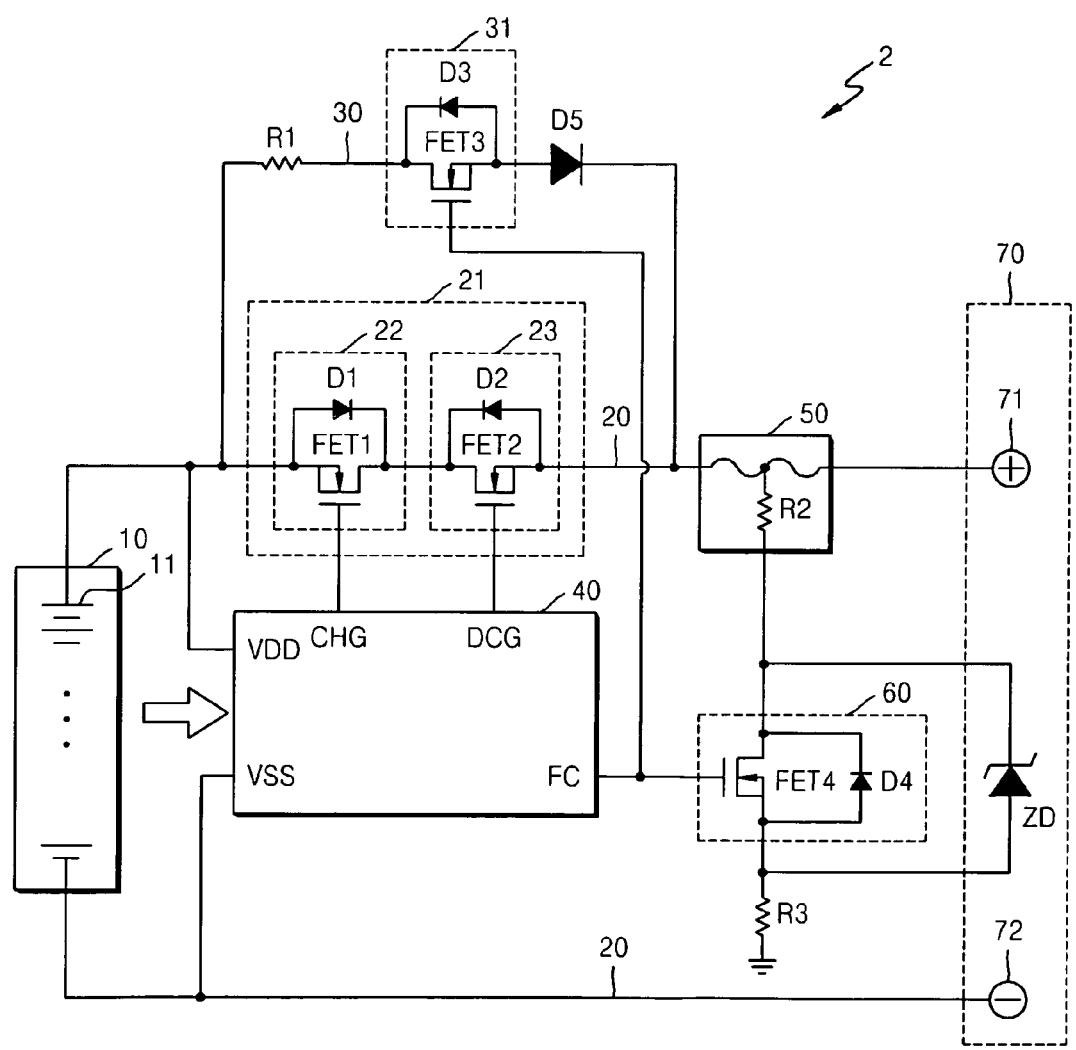
FIG. 2 illustrates a circuit diagram of a battery pack according to an embodiment.

FIG. 2 illustrates a circuit diagram of a battery pack 2 according to another embodiment. The battery pack 2 according to the present embodiment may be substantially the same as the battery pack 1 of FIG. 1 except for the following point.

Referring to FIG. 2, the same control signal is applied to the fuse current control switch 31 and the fuse blowing switch 60 included in the battery pack 2. That is, the BMS 40 generates the first blowing signal, and the first blowing signal is commonly applied to the fuse current control switch 31 and the fuse blowing switch 60 through the fuse control terminal FC. To use only a single blowing signal, the field effect transistors FET3 and FET4 respectively included in the fuse current control switch 31 and the fuse blowing switch 60 may have the same channel type.

When the battery 10 operates normally, the charging control switch 22 and the discharging control switch 23 included in the charge and discharge control switch 21 may allow a charging current or a discharging current to flow. However, if the battery 10 malfunctions, the charging control switch 22 and the discharging control switch 23 may not allow a charging current or a discharging current to flow. However, the FET1 and the FET2 respectively included in the charging control switch 22 and discharging control switch 23 may have defects, e.g., arising during manufacturing or during use of the battery packs 1 and 2.

In this regard, when the FET1 and the FET2 are completely short-circuited, no problems may occur in blowing the fuse 50, because a current flows through the FET1 and the FET2. On the other hand, if the FET1 and the FET2 have defects, such that they are open and have high resistance, problems may occur in blowing the fuse 50.

When the FET1 and the FET2 have high resistance due to their defects, even when the BMS 40 applies a control signal for turning off the charging control switch 22 or the discharging control switch 23 to the FET1 and the FET2, a low current may flow along the high-current path 20. When a charger is connected to the terminal unit 70 and a charging current enters, the charging current may flow through the resistor R2 included in the fuse 50. Thus, the fuse 50 may be blown. However, when the terminal unit 70 is connected to an electronic device and a discharging current flows, intensity of the discharging current may be too low. Thus, the fuse 50 may not be blown. Accordingly, even though an operation of the battery 10 needs to stop due to the battery 10 continuing to malfunction, discharging operation continues. Thus, the battery packs 1 and 2 may explode.

However, in the battery packs 1 and 2 according to embodiments, a separate path is formed to allow a high current to flow even if the FET1 and the FET2 malfunction, so that a sufficient intensity of current flows through the resistor R2 in the fuse 50. Accordingly, when the battery 10 malfunctions, the fuse 50 may be completely blown.

Figure 3:
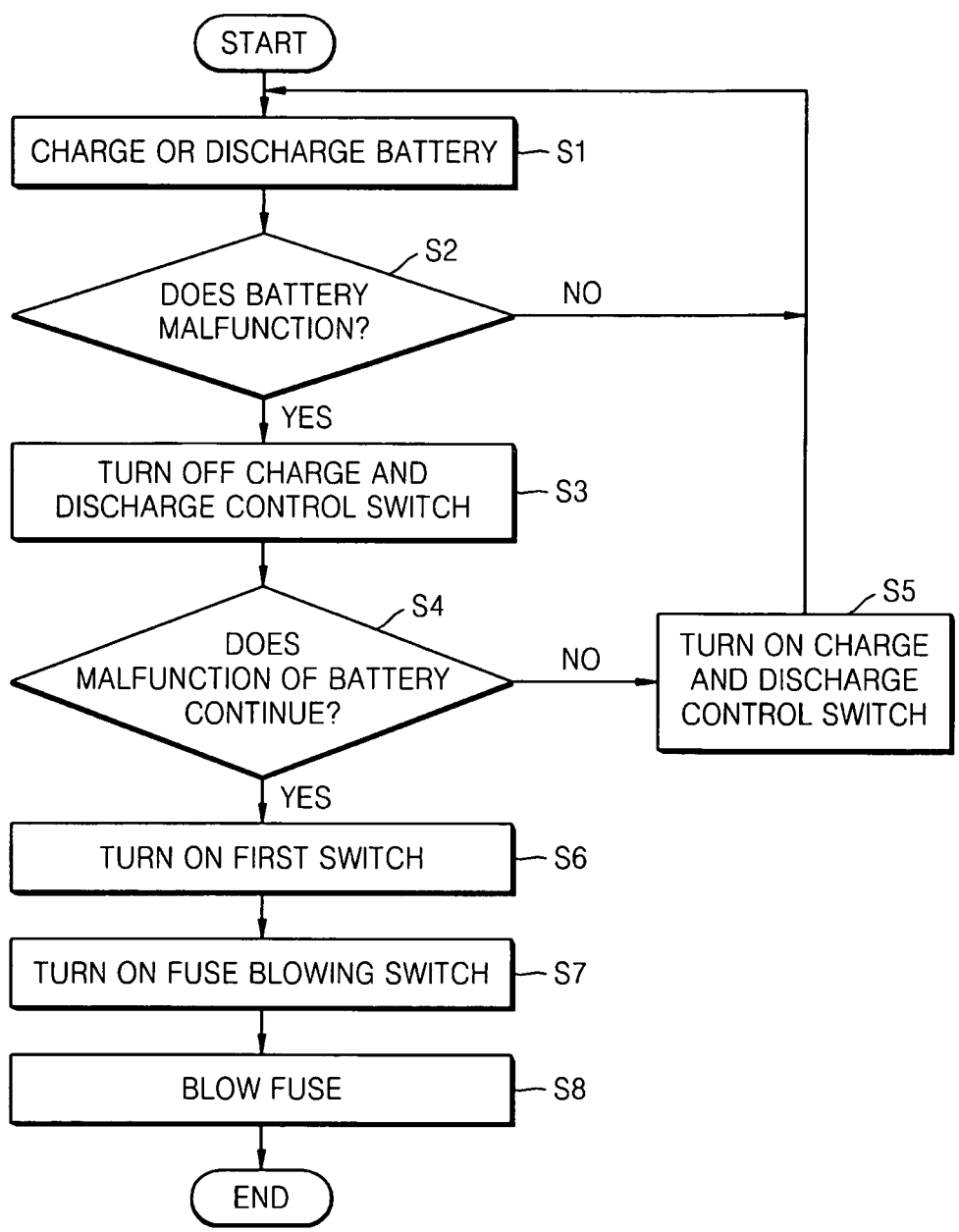
FIG. 3 illustrates a flowchart of a method of controlling a battery protection circuit, according to an embodiment.

FIG. 3 illustrates a flowchart of a method of controlling a battery protection circuit, according to an embodiment. FIGS. 4A through 4D are views for explaining an operation of a battery protection circuit of the battery pack 1 of FIG. 1. An operation of the battery pack 2 of FIG. 2 is substantially the same as the operation of the battery pack 1 of FIG. 1, and thus, will not be described in detail here.

Referring to FIG. 3, when the external device is connected to the terminal unit 70 of the battery pack 1, the battery 10 is charged or discharged (S1). The BMS 40 monitors the battery 10 in real time to determine whether the battery 10 malfunctions (S2). As long as the battery 10 does not malfunction, the charging or discharging of the battery 10 continues.

Figure 4A:
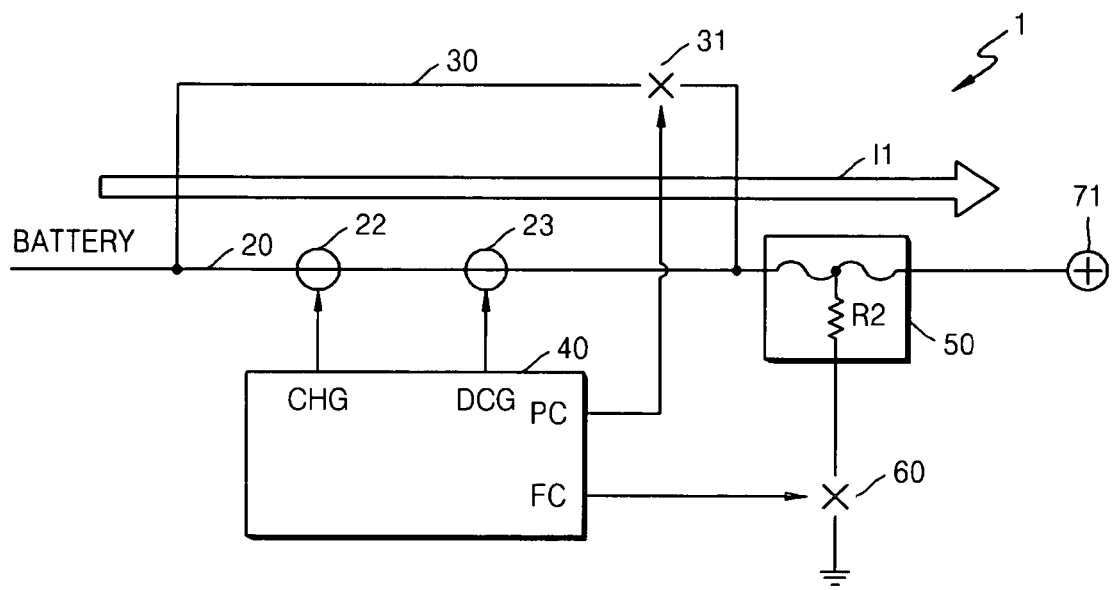
FIGS. 4A through 4D illustrate views for explaining operation of a battery protection circuit of the battery pack of FIG. 1.

Referring to FIG. 4A, normally, the charging control switch 22 and the discharging control switch 23 are turned on and a current I1 flows along the high-current path 20. In this case, the fuse current control switch 31 and the fuse blowing switch 60 are turned off.

If the battery 10 malfunctions, the BMS 40 applies a control signal to the charge and discharge control switch 21 to turn off the charging control switch 22 or the discharging control switch 23 (S3). Thus, the charging or discharging operation stops.

Figure 4B:
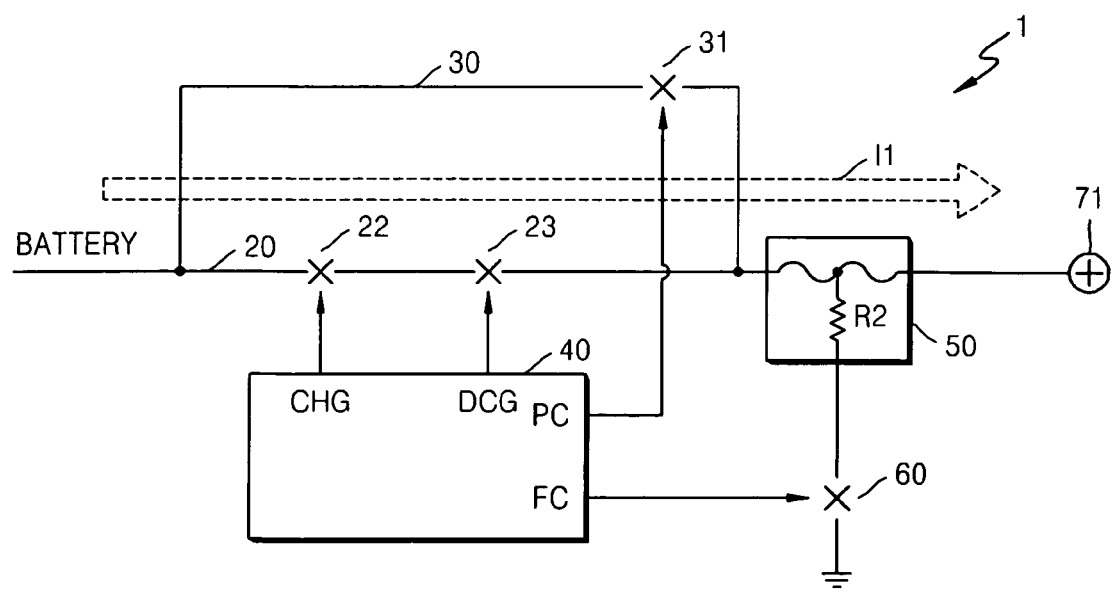

Referring to FIG. 4B, the charging control switch 22 and the discharging control switch 23 are turned off. However, if the FET1 and the FET2 have defects, the flow of a current is not completely blocked. Thus, the current continues to flow along the high-current path 20. In this case, intensity of a current flowing along the high-current path 20 in FIG. 4B may be less than intensity of a current flowing along the high-current path 20 in FIG. 4A.

After the BMS 40 turns off the charging control switch 22 and/or the discharging control switch 23 (S3), the BMS 40 then determines whether the abnormal state of the battery 10 continues (S4). If the abnormal state of the battery 10 ends after the charging control switch 22 and/or the discharging control switch 23 has been turned off, the BMS 40 turns on the charge and discharge control switch 21 to allow the battery 10 to be charged or discharged (S5).

On the other hand, if the abnormal state of the battery 10 continues after the charging control switch 22 and/or the discharging control switch 23 has been turned off, the BMS 40 turns on the fuse current control switch 31 to allow the fuse blowing current to flow along the fuse blowing path 30 (S6). Also, the BMS 40 turns on the fuse blowing switch 60 to allow a current to flow through the resistor R2 included in the fuse 50 (S7).

Figure 4C:
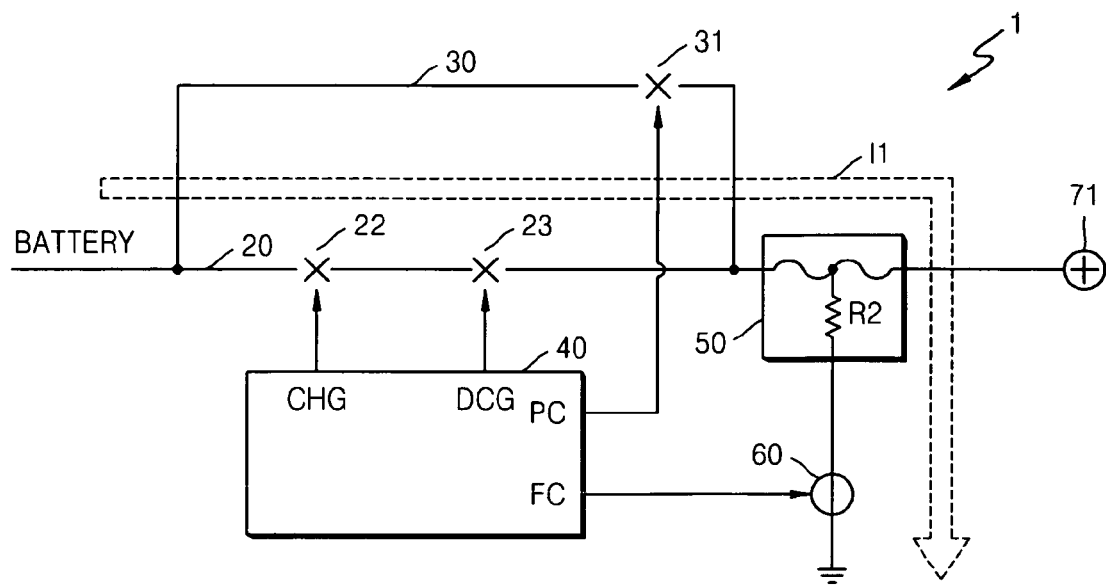

Referring to FIG. 4C, if only the fuse blowing switch 60 is turned on, the current I1 flowing along the high-current path 20 flows to ground through the resistor R2 included in the fuse 50. However, since the current I1 is not high, heat generated at the resistor R2 does not have sufficient intensity to blow the fuse 50.

Figure 4D:
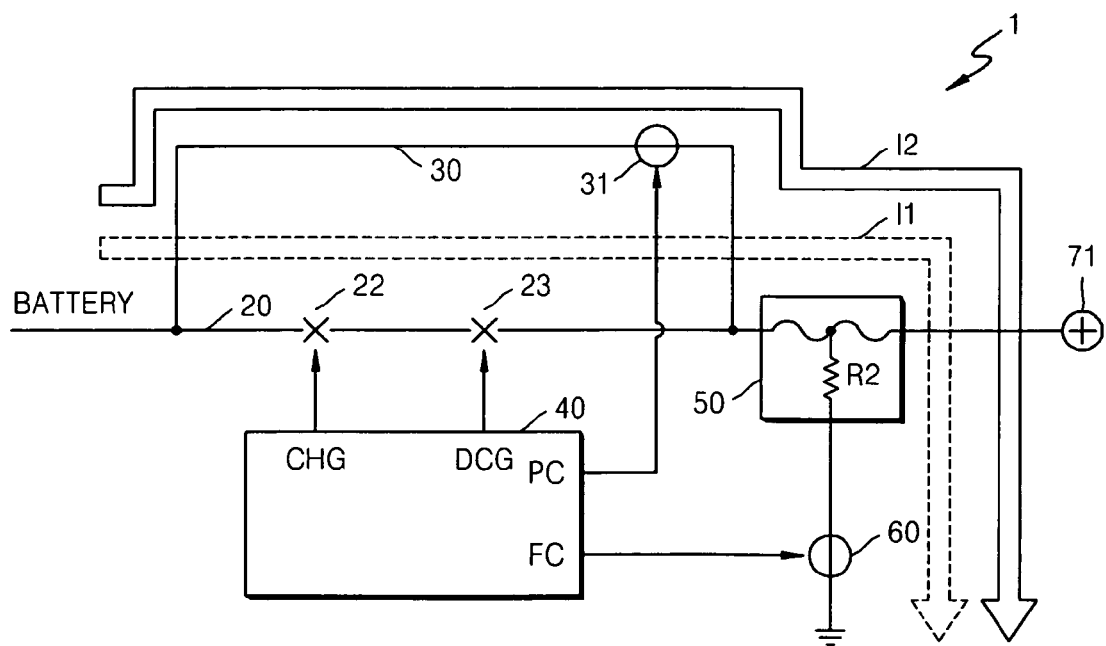

Referring to FIG. 4D, the fuse current control switch 31 is turned on together with the fuse blowing switch 60. If the fuse current control switch 31 is turned on, a current I2 flows along the fuse blowing path 30 connected to the high-current path 20 in parallel and flows through the resistor R2 included in the fuse 50.

If the intensity of a current flowing through the resistor R2 is equal to or greater than a reference value, the fuse 50 is blown due to heat generated at the resistor R2 (S8). That is, the sum of the current I1 and the I2 may be equal to or greater than a reference value for blowing the fuse 50. Accordingly, the battery pack 1 may be permanently disabled.

As described above, in the battery packs 1 and 2 according to the above embodiments, a separate path is formed to allow a high current to flow even when the charging control switch 22 and/or the discharging control switch 23 malfunction. Thus, a sufficient intensity of current flows through the resistor R2 included in the fuse 50 to blow the fuse 50. Accordingly, when the battery 10 malfunctions, the fuse 50 may be completely blown.

It should be understood that the exemplary embodiments described herein should be considered in a descriptive sense only and not for purposes of limitation. Descriptions of features or aspects within each embodiment should typically be considered as available for other similar features or aspects in other embodiments.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A battery protection circuit, comprising:
   a fuse blowing path connected in parallel to at least a portion of a high-current path between a battery and a terminal unit, the high-current path having a fuse therein;
   a fuse current control switch in the fuse blowing path, the fuse current control switch controlling a current flow along the fuse blowing path;
   a fuse blowing switch between the fuse and ground, the fuse blowing switch controlling blowing of the fuse; and
   a battery management system to generate a switch control signal and to apply the switch control signal to the fuse current control switch and the fuse blowing switch, the switch control signal to turn on the fuse current control switch and the fuse blowing switch at a same time period when the battery malfunctions.

2. The battery protection circuit as claimed in claim 1, further comprising
   a charge/discharge switch in the high-current path, the charge/discharge switch controlling charging and discharging of the battery.

3. The battery protection circuit as claimed in claim 2, wherein the fuse is connected between the charge/discharge switch and the terminal unit.

4. The battery protection circuit as claimed in claim 2, wherein the fuse blowing path is connected in parallel with the charge/discharge switch.

5. The battery protection circuit as claimed in claim 2, wherein the charge/discharge switch includes:
   a charging control switch in the high-current path, the charging control switch controlling charging of a battery; and
   a discharging control switch in the high-current path, the discharging control switch controlling discharging of the battery.

6. The battery protection circuit as claimed in claim 1, further comprising a Zener diode connected in parallel to the fuse blowing switch.

7. The battery protection circuit as claimed in claim 1, further comprising a diode in the fuse blowing path.

8. The battery protection circuit as claimed in claim 7, wherein the diode is between the fuse current control switch and the fuse.

9. The battery protection circuit as claimed in claim 8, further comprising a resistor in the fuse blowing path, the resistor between the fuse current control path and the high current path.

10. A method of controlling a battery protection circuit including a fuse blowing path connected in parallel to at least a portion of a high-current path between a battery and a terminal unit, the high-current path having a fuse therein, a fuse current control switch in the fuse blowing path, the fuse current control switch controlling a current to flow along the fuse blowing path, and a fuse blowing switch between the fuse and ground, the fuse blowing switch controlling blowing of the fuse, the method comprising,
    monitoring a state of the battery; and
    when the battery malfunctions, generating a switch control signal and applying the switch control signal to the fuse current control switch and the fuse blowing switch to turn on the fuse current control switch and the fuse blowing switch at a same time period to allow the current to flow along the fuse blowing path.

11. The method as claimed in claim 10, wherein the battery protection circuit further includes a charging/discharging switch in the high current path, the method comprising:
    before turning on the fuse current control switch, turning off the charging/discharging switch; and
    determining whether the battery continues to malfunction.

12. A method of protecting a battery, the method comprising:
    providing a fuse in a high current path between the battery and a terminal unit;
    forming a fuse blowing path, separate from the high current path, the fuse blowing path connected in parallel to at least a portion of the high current path; and
    applying a current from the fuse blowing path to the fuse when the battery malfunctions, wherein the current is generated by turning on a fuse current control switch in the fuse blowing path, the fuse current control switch controlling the current along the fuse blowing path and a fuse blowing switch between the fuse and ground blowing the fuse in response to a same switch control signal applied to the fuse current control switch and the fuse blowing switch at a same time period.

* * * * *